US008560172B2

(12) United States Patent
Lee et al.

(10) Patent No.: US 8,560,172 B2
(45) Date of Patent: Oct. 15, 2013

(54) ELECTRIC SUSPENSION CONTROL APPARATUS

(71) Applicant: Hitachi Automotive Systems, Ltd., Ibaraki (JP)

(72) Inventors: Tomoyuki Lee, Yokohama (JP); Noriyuki Utsumi, Tokyo (JP); Masaaki Uchiyama, Tokyo (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 0 days.

(21) Appl. No.: 13/751,749

(22) Filed: Jan. 28, 2013

(65) Prior Publication Data

US 2013/0197754 A1    Aug. 1, 2013

(30) Foreign Application Priority Data

Jan. 31, 2012    (JP) .................................. 2012-018947

(51) Int. Cl.
*B60G 23/00* (2006.01)
(52) U.S. Cl.
USPC .......................................................... 701/37
(58) Field of Classification Search
USPC .......................................................... 701/37
See application file for complete search history.

(56) References Cited

U.S. PATENT DOCUMENTS

| 6,102,419 | A  | * | 8/2000 | Chun ..................... 280/124.135 |
| 7,821,742 | B1 | * | 10/2010 | Mei ............................. 360/294.3 |
| 2006/0180562 | A1 | * | 8/2006 | Rohr et al. ..................... 212/71 |
| 2009/0223322 | A1 | * | 9/2009 | Kossira et al. .................. 74/828 |

FOREIGN PATENT DOCUMENTS

JP    2010-279121    12/2010

* cited by examiner

*Primary Examiner* — Hussein A. Elchanti
(74) *Attorney, Agent, or Firm* — Wenderoth, Lind & Ponack, LLP (57) ABSTRACT

The controller inputs a required thrust force value calculated by a required thrust force calculation unit, to a low frequency filter and a high frequency filter. Output values of the low frequency filter and the high frequency filter are amplitude-limited by a low frequency limiter and a high frequency limiter, respectively. Output values of the low frequency limiter and the high frequency limiter are added, and the added value is output into an inverter as a thrust force instruction value. In this case, a limit value of the low frequency limiter is set to be smaller than a limit value of the high frequency limiter.

7 Claims, 6 Drawing Sheets

ELECTRIC SUSPENSION CONTROL APPARATUS

BACKGROUND OF THE INVENTION

1. Technical Field

The present invention relates to an electric suspension apparatus preferably for use in absorbing a vibration of a vehicle such as an automobile or a railroad vehicle.

2. Background Art

Generally, a suspension apparatus is disposed between a vehicle body and a wheel in a vehicle such as an automobile. As such a suspension apparatus, there is known an electric suspension apparatus using an electric actuator including a stator and a movable element supported so as to be movable relatively linearly to each other (for example, refer to Japanese Patent Public Disclosure No. 2010-279121).

This type of electric suspension apparatus according to conventional techniques is configured to adjust a thrust force of the electric actuator according to a thrust force instruction value (a control signal) output from a controller (a control apparatus).

SUMMARY OF THE INVENTION

The electric suspension apparatus is desired to be configured to have a small size while maintaining the thrust force of the electric actuator. On the other hand, there is such a problem that increasing a current supplied to the electric actuator to secure the thrust force leads to an increase in a calorific value.

The present invention has been contrived in consideration of the above-described problem with conventional techniques, and an object of the present invention is to provide an electric suspension control apparatus capable of reducing a calorific value of an electric actuator.

For achieving the above-described object, the present invention is an electric suspension control apparatus disposed between a body and a wheel of a vehicle, and configured to adjust a thrust force of an electric actuator according to a thrust force instruction value output by a control unit. At least one movement detection unit is connected to the control unit. The movement detection unit is configured to detect a movement state of the vehicle. The control unit includes a required thrust force calculation unit configured to calculate a required thrust force value from a detection value detected by the movement detection unit, a frequency band determination unit configured to distribute the calculated value of the required thrust force calculation unit to a plurality of frequency bands, a limiter provided for each of the frequency bands to which the calculated value is distributed by the frequency band determination unit, and a thrust force instruction value calculation unit configured to generate the thrust force instruction value by combining an output value by the limiter for each frequency band. A limit value of the limiter is set in such a manner that the a value in a low frequency band as one of the frequency bands is smaller than a value in a high frequency band as another of the frequency bands.

According to the present invention, it is possible to reduce a calorific value of the electric actuator.

DETAILED DESCRIPTION OF THE PREFERRED EMBODIMENTS

In the following description, an electric suspension control apparatus according embodiments of the present invention will be described in detail with reference to the accompanying drawings based on an example in which the electric suspension control apparatus is employed to, for example, a four-wheeled automobile. The electric suspension control apparatus according to the present invention can be used for not only an automobile, but also for a railroad vehicle instead of a damper such as a yaw damper or a lateral dynamic damper.

Figure 1:
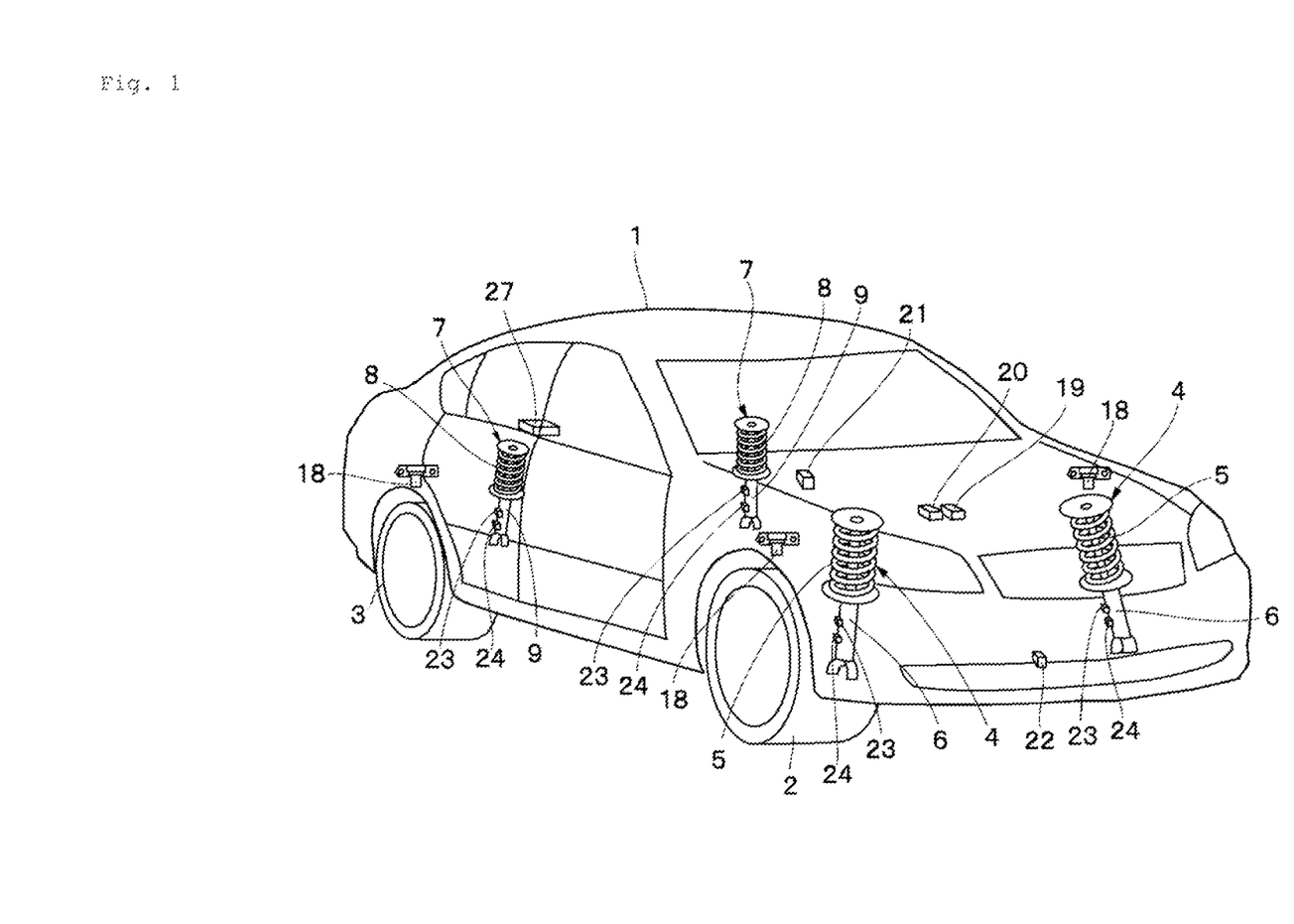
FIG. 1 is a perspective view illustrating a four-wheeled automobile to which an electric suspension control apparatus according to a first embodiment of the present invention is employed.

FIGS. 1 to 4 illustrate a first embodiment of the present invention. Referring to FIG. 1, for example, left and right front wheels 2 (only one of them is illustrated) and left and right rear wheels 3 (only one of them is illustrated) are disposed under a vehicle body 1, which constitutes a body of the vehicle.

Front wheel electric suspension apparatuses 4 (hereinafter referred to as "the suspension apparatuses 4") are disposed between the vehicle body 1 and the left and right front wheels 2. Each suspension apparatus 4 includes a left or right suspension spring 5 (hereinafter referred to as "the spring 5"), and a left or right electric actuator 6 disposed between the vehicle body 1 and the left or right front wheel 2 in parallel with the spring 5.

Rear wheel electric suspension apparatuses 7 (hereinafter referred to as "the suspension apparatuses 7") are disposed between the vehicle body 1 and the left and right rear wheels 3. Each suspension apparatus 7 includes a left or right suspension spring 8 (hereinafter referred to as "the spring 8"), and a left or right electric actuator 9 disposed between the vehicle body 1 and the left or right rear wheel 3 in parallel with the spring 8.

Each suspension apparatus 4, 7 is configured so as to adjust a thrust force of the electric actuator 6, 9 according to a thrust force instruction value output from a controller 27, which will be described below.

Next, the electric actuator 6, 9 constituting each suspension apparatus 4, 7 will be described. The present embodiment will be described based on an example in which the electric actuator 6, 9 is constituted by a linear motor. However, the present invention is not limited thereto. For example, the electric actuator may be constituted by a rotational motor and a ball screw mechanism.

Figure 3:
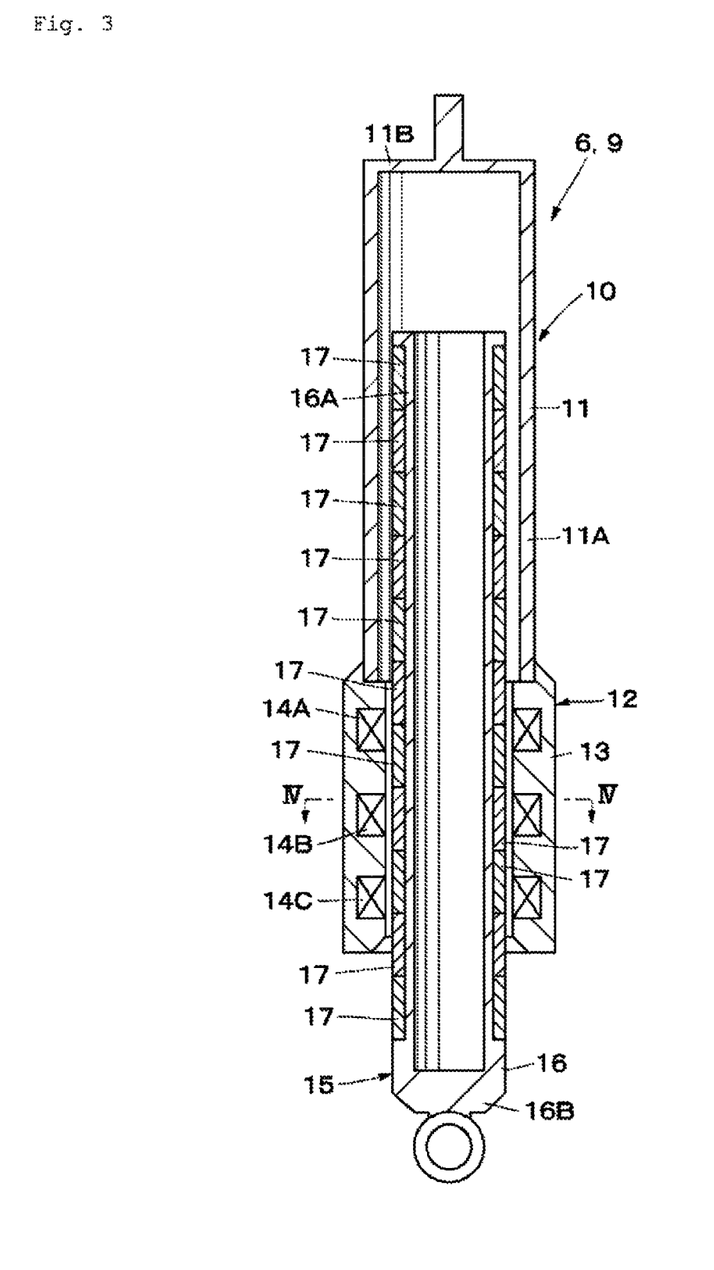
FIG. 3 is a vertical cross-sectional view illustrating an electric actuator.
Figure 4:
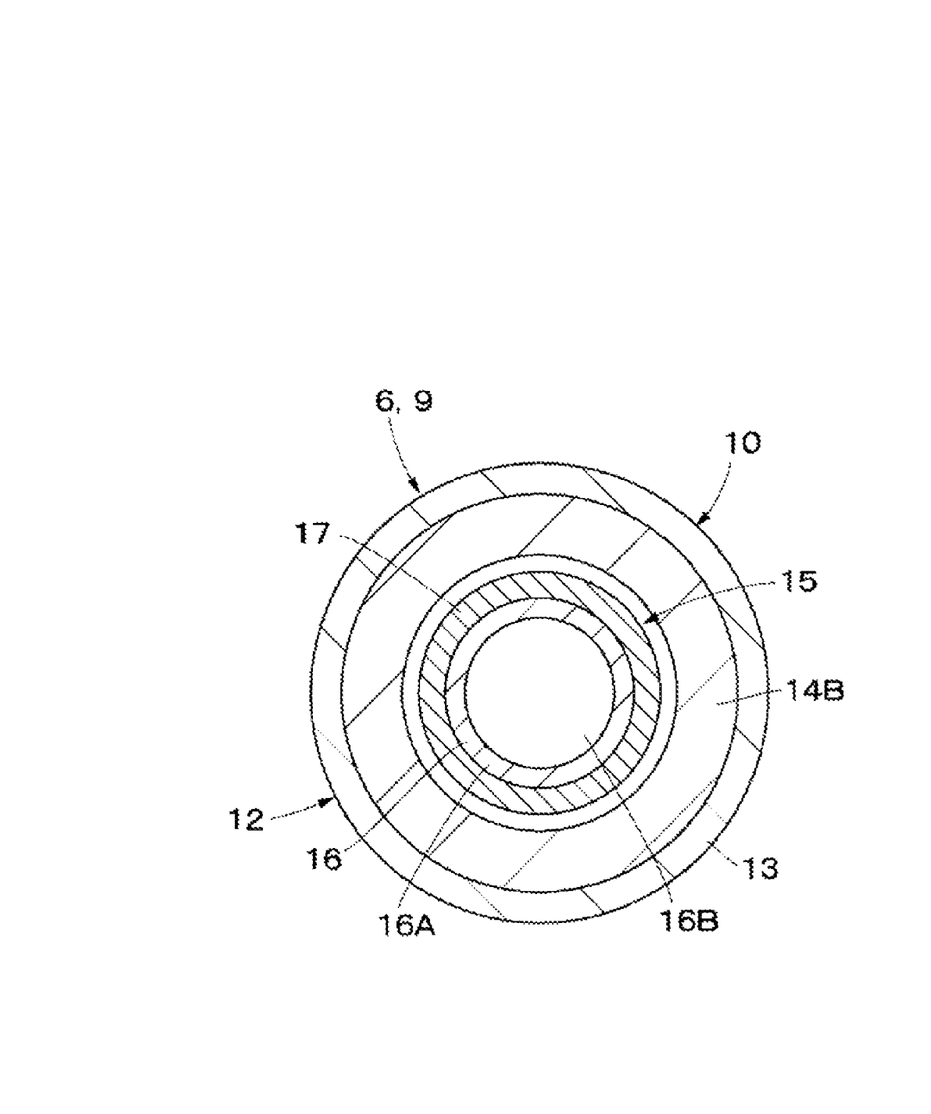
FIG. 4 is an enlarged cross-sectional view as viewed from a direction indicated by arrows IV-IV illustrated in FIG. 3.

As illustrated in FIGS. 3 and 4, the electric actuator 6, 9 is configured as a linear motor, and includes a stator 10 and a movable element 15. Then, a three-phase linear synchronous motor is constituted by the stator 10 (an armature 12 of the stator 10) and the movable element 15 (permanent magnets 17 of the movable element 15).

The stator 10 disposed at a sprung member (the vehicle body side) of the vehicle generally includes a casing 11 and the armature 12. The casing 11 has, for example, a bottomed cylindrical shape, and includes a cylinder portion 11A extending in an axial direction (a vertical direction in FIG. 3), which corresponds to a stroke direction, and a bottom portion 11B covering one end side (an upper end side in FIG. 3) of the cylinder portion 11A. The armature 12 is fixed to an opening end side (a lower end side in FIG. 3) of the cylinder portion 11A.

The armature 12 includes a substantially cylindrical core 13 formed from, for example, a powder magnetic core, a laminated electrical steel sheet, or a magnetic body piece by, for example, cutting processing, and a plurality of coils 14A, 148, and 14C wound in a predetermined direction and contained in the core 13.

Each of the coils 14A, 14B, and 14C are disposed so as to face an outer circumferential surface of the movable element 15 (the permanent magnets 17 of the movable element 15), which will be described below. For example, the coils 14A, 14B, and 14C are disposed in a circumferential direction of the core 13 at positions at an inner circumferential surface side of the substantially cylindrical core 13 as illustrated in FIG. 4, and are disposed at three positions in the axial direction of the substantially cylindrical core 13 in a spaced-apart relationship in the axial direction as illustrated in FIG. 3. The number of the coils 14A, 14B, and 14C is not limited to the illustrated one, and can be set appropriately according to, for example, a design specification.

The three coils 14A, 14B, and 14C are disposed so as to have a phase difference from the adjacent coil in the axial direction by, for example, an electric angle of 120 degrees. The wiring method can be selected appropriately according to a voltage of a driving power source side and a current specification.

The movable element 15 disposed at an unsprung member (the wheel side) of the vehicle axially extends within the stator 10, and is contained so as to be displaceable in the stroke direction (the axial direction) in the stator 10 via, for example, a not-illustrated bearing. The movable element generally includes a yolk 16 and the plurality of permanent magnets 17.

The yolk 16 is made of, for example, a magnetic body, and has a bottomed cylindrical shape. The yolk 16 includes a cylindrical portion 16A extending in the axial direction, which corresponds to the stroke direction, and a bottom portion 16B covering the other end side (the lower end side in FIG. 3) of the cylindrical portion 16A.

The plurality of annular permanent magnets 17, which functions as a field system, is disposed so as to be arrayed along the axial direction at an outer circumferential surface side of the cylindrical portion 16A of the yolk 16. In this case, the respective permanent magnets 17 adjacent to each other in the axial direction have, for example, reverse polarities of each other. In the illustrated example, the field system is constituted by the permanent magnets 17, but may be constituted by coils.

When there is a relative displacement between the stator 10 (the armature 12 of the stator 10) and the movable element 15 (the permanent magnets 17 of the movable element 15), an induced voltage occurs according to an amount of a change in a magnetic flux interlinking the coils 14A, 14B, and 14C. In a case where the coils 14A, 14B, and 14C are short-circuited therebetween, a short-circuit current flows to generate a resistance force. This resistance force falls in a linear region, wherein the resistance force increases according to the spees, a saturation region, wherein the increase of the resistance force according to the speed becomes around zero or smaller than that in the linear region, or a reduction region, wherein the resistance force decreases according to the speed, and can be changed according to the design of the electric actuator 6, 9 (the suspension apparatus 4, 7).

When a required thrust force (a required control force) is smaller than a resistance force generated by short-circuiting of the electric actuator 6, 9, energy corresponding to a difference therebetween is reused by a power source 25, which will be described below. On the other hand, when it is necessary to provide a larger resistance force than a resistance force generated by the electric actuator 6, 9, or it is necessary to provide an assist force (a thrust force at an opposite side from a resistance force), a higher voltage than an induced voltage generated by the electric actuator 6, 9 is supplied from the power source 25, thereby achieving the required thrust force (the required control force). In either case, the suspension apparatus 4, 7 is configured in such a manner that a thrust force of the electric actuator 6, 9 is adjusted according to a thrust force instruction value output from the controller 27, which will be described below.

Next, various kinds of sensors 18 to 24 connected to the controller 27 will be described with reference to FIG. 2.

A plurality of vertical acceleration sensors 18, which is mounted on the vehicle body 1 and corresponds to a movement detection unit, detects a vertical vibration acceleration (a vertical acceleration) at the vehicle body 1, which corresponds to the sprung side. In other words, each of the vertical acceleration sensors 18 detects a vertical movement state of the vehicle when the vehicle is running as an acceleration of a vertical vibration, and outputs a detection signal thereof to the controller 27, which will be described below. The vertical acceleration sensors 18 may be, for example, disposed at positions corresponding to all four wheels. Alternatively, like the illustrated example, three vertical acceleration sensors 18 may be disposed in total at the respective left and right front wheels 2 and any one of the left and right rear wheels 3. Further alternatively, only one vertical acceleration sensor 18 may be disposed at the vehicle body 1, and a vertical acceleration may be estimated from values of a lateral acceleration sensor 19 and a longitudinal acceleration sensor 20, which will be described below.

The lateral acceleration sensor (left-right acceleration sensor) 19, which is mounted on the vehicle body 1 and corresponds to the movement detection unit, detects an acceleration in a lateral direction of the vehicle (a left-right acceleration). More specifically, the lateral acceleration sensor 19 detects a movement state of the vehicle in the lateral direction when the vehicle is running as an acceleration of a lateral vibration, and outputs a detection signal thereof to the controller 27, which will be described below.

A longitudinal acceleration sensor 20, which is mounted on the vehicle body 1 and corresponds to the movement detection unit, is disposed, for example, near the lateral acceleration sensor 19, and detects an acceleration in a longitudinal direction of the vehicle (a front-rear acceleration). More specifically, the longitudinal acceleration sensor 20 detects a movement state of the vehicle in the longitudinal direction when the vehicle is running as an acceleration of a longitudinal vibration, and outputs a detection signal thereof to the controller 27, which will be described below.

A steering angle sensor 21, which is mounted on the vehicle body 1 and corresponds to the movement detection unit, is constituted by, for example, an angle sensor disposed at a steering wheel (not illustrated), and detects a steering angle of the steering wheel operated by a driver. More specifically, the steering angle sensor 21 detects a movement state of the vehicle when the vehicle is running as a steering angle of the steering wheels, and outputs a detection signal thereof to the controller 27, which will be described below.

A vehicle speed sensor 22, which is mounted at the vehicle body 1 and corresponds to the movement detection unit, detects, for example, a running speed of the vehicle (a vehicle speed). More specifically, the vehicle speed sensor 22 detects a movement state of the vehicle when the vehicle is running as a vehicle speed, and outputs a detection signal thereof to the controller 27, which will be described below.

A stroke sensor 23, which is mounted at each suspension apparatus 4, 7 and corresponds to the movement detection unit, detects, for example, a stroke (an extension or compression amount) of each suspension apparatus 4, 7 (the electric actuator 6, 9). More specifically, the stroke sensor 23 detects a movement state of the vehicle when the vehicle is running as a stroke of each suspension apparatus 4, 7, and outputs a detection signal thereof to the controller 27 and an inverter 26, which will be described below.

A temperature sensor 24, which is mounted at each suspension apparatus 4, 7 and corresponds to the movement detection unit, detects, for example, a temperature of the electric actuator 6, 9 of each suspension apparatus 4, 7. More specifically, the temperature sensor 24 detects a movement state of the vehicle when the vehicle is running as a temperature of the electric actuator 6, 9, and outputs a detection signal thereof to the controller 27, which will be described below.

Next, the power source 25 and the inverter 26 for driving the electric actuator 6, 9 will be described.

The power source 25 supplies power for driving the electric actuator 6, 9 to the inverter 26. The power source can be constituted by, for example, a battery mounted on the vehicle. More specifically, for example, if the vehicle is a vehicle using an engine (an internal combustion engine) as a driving source, the power source 25 may be realized by employing a configuration of, for example, receiving a power supply from a power source specially provided for the electric suspension apparatus or an alternator, and temporarily storing the received power in, for example, a capacitor for the electric actuator 6, 9.

Alternatively, if the vehicle is a hybrid vehicle or an electric vehicle, it is possible to receive power supply from a high-voltage driving battery mounted on the vehicle. In this case, when the electric actuator 6, 9 outputs a large thrust force (a control force), this leads to a large voltage drop of the driving battery, which may, for example, reduce an acceleration of the vehicle or affect the periphery devices. To avoid them, the vehicle may be configured in such a manner that a capacitor is disposed between the driving battery and the inverter 26. Further, if necessary, energy stored by regeneration from the electric actuator 6, 9 may be supplied to the driving battery. In this case, it is possible to increase the mileage of the vehicle.

The inverter 26 connected to the electronic actuator 6, 9 drives the electronic actuator 6, 9 of each suspension apparatus 4, 7 based on a control signal (a thrust force instruction value) from the controller 27 and power supplied form the power source 25. The inverter 26 is formed by using a plurality of switching elements (not illustrated) constituted by, for example, a transistor, a thyristor, and an Insulated Gate Bipolar Transistor (IGBT). To cause the electronic actuator 6, 9 to exert a force, power is supplied from the power source 25 to the electric actuator 6, 9 via the inverter 26. At the time of regeneration, power is returned from the electric actuator 6, 9 to the power source 25 via the inverter 26.

Next, the controller 27, which adjusts a thrust force (a control force) of the electric actuator 6, 9, will be described.

Figure 2:
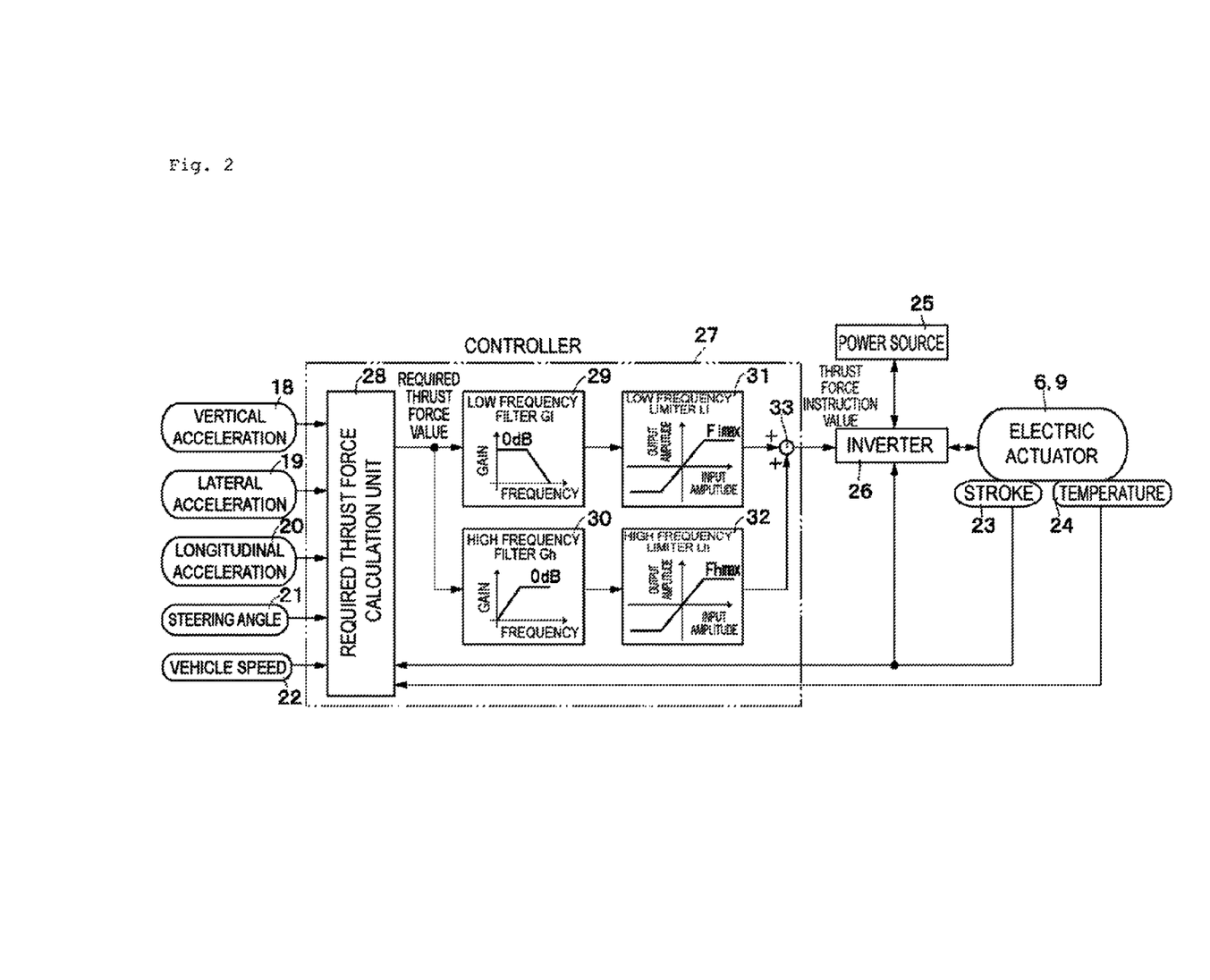
FIG. 2 is a control block diagram illustrating the electric suspension control apparatus according to the first embodiment.

As illustrated in FIG. 2, the controller 27 as a control unit constituted by, for example, a microcomputer, is connected at the input side thereof to, for example, the vertical acceleration sensors 18, the lateral acceleration sensor 19, the longitudinal acceleration sensor 20, the steering angle sensor 21, the vehicle speed sensor 22, the stroke sensor 23, and the temperature sensor 24. Further, the controller 27 is connected at the output side thereof to the electric actuator 6, 9 via the inverter 26.

The controller 27 calculates a control force required to control ride comfort and a posture of the vehicle, i.e., a resistance force or a thrust force of the electric actuator 6, 9 according to a specific control law such as the Skyhook theory from various kinds of state amounts (vehicle information) indicating a movement state of the vehicle such as a vertical acceleration, a lateral acceleration, a longitudinal acceleration, a vehicle speed, a steering angle, a stroke of the electric actuator 6, 9, and a temperature of the vehicle body. Then, the controller 27 is configured so as to output a control signal (a thrust force instruction value) corresponding to the calculation result to the inverter 26, thereby enabling an output of a required control force from the electric actuator 6, 9.

Further, the controller 27 monitors each suspension apparatus 4, 7 based on state amounts (suspension information) indicating a state of each suspension apparatus 4, 7 such as a stroke and a temperature of the electric actuator 6, 9. More specifically, the controller 27 is configured in such a manner that, when the controller 27 detects an abnormality of the suspension apparatus 4, 7, the controller 27 can take measures such as stopping control of the electric actuator 6, 9 or reducing the control force, and issue a warning to a driver as necessary.

The suspension apparatus 4, 7 using the electric actuator 6, 9 can directly generate a control force (a thrust force) between the sprung side (the vehicle body side) and the unsprung side (the wheel side). Therefore, the suspension apparatuses 4 and 7 can highly effectively realize a suspension characteristic based on, for example, the Skyhook theory, thereby improving ride comfort and steering stability of the vehicle.

On the other hand, for example, the electric actuator 6, 9 using the permanent magnets 17 generates a thrust force proportional to a current, and generates a calorific value (a copper loss) proportional to the square of the current. In other words, an output of a double control force corresponds to generation of a quadruple calorific value. Therefore, a continuous output of a large thrust force results in a temperature increase, and keep using the electric actuator 6, 9 at a high temperature may lead to insulation deterioration of the coils 14A, 14B, and 14C and irreversible flux losses of the permanent magnets 17. Therefore, it is important to determine a maximum allowable temperature and strictly manage the temperature of the electric actuator 6, 9 to prevent, for example, irreversible flux losses of the permanent magnets 17.

For example, when the vehicle is running on a rough road surface (a bad road), a large control force is required instantaneously, but few road surfaces continuously require a large control force, and in most cases, the control force has a value frequently changing from the zero point to the positive side and the negative side. In other words, when the vehicle is running on a rough road surface, the electric actuator 6, 9 alternately outputs an extension force (a thrust force to the extension side) and a compression force (a thrust force to the compression side) according to a input of a road surface, whereby the effective control force is reduced, and therefore the calorific value is also reduced. Further, when the vehicle is running on a rough road surface, the electric actuator 6, 9 extends and compresses (has a stroke), whereby the phase of a current shifts according to the stroke, thereby leading to even heat generation.

On the other hand, for example, when the electric actuator 6, 7 continuously outputs a constant force, for example, during execution of a steady turning, a current is continuously supplied for a time when the constant force continues being output, so a calorific value of the coils 14A, 14B, and 14C increases. Especially, in this situation, the electric actuator 6, 9 may have a small stroke, and a current may be unevenly supplied only to a specific phase, locally increasing a temperature (locally generate much heat). This may result in, for example, occurrence of irreversible flux losses of the permanent magnets 17 and loosening and insulation deterioration of the coils 14A, 14B, and 14C.

On the other hand, one possible configuration is to perform control of the electronic suspension apparatus while dividing the control into vehicle body posture control for reducing a roll motion and a pitch motion of the vehicle body and vibration control for damping a vibration of the vehicle body. According to this configuration, it is considered that it is possible to reduce a current amount supplied to the electric actuator by limiting the vehicle body posture control as necessary to reduce a temperature increase accordingly.

However, according to this configuration, when there is a sudden steering input such as a slalom or a double lane change, limiting the vehicle body posture control may make it difficult to sufficiently secure steering stability. In other words, with a limitation to the vehicle body posture control, it may be difficult to respond to posture control of a high frequency.

Further, in such a situation that the electric actuator 6, 9 continues outputting a constant force, for example, during execution of a steady turning, when a road surface condition changes, a posture control component is limited to secure a vibration control component, whereby the movement of the vehicle body may change. In other words, in such a state that the electric actuator 6, 9 continues outputting a constant force, for example, during execution of a steady turning, for example, when there is an input from a protrusion from a road surface, the posture control force may change under the influence of the vibration control component, and for example, a roll angle may be deteriorated. As a result, even for a running in a same steady turning, for example, the roll angle may vary according to a road surface, providing discomfort to a driver.

For solving these problems, the present embodiment is configured so as to be able to control the electric actuator 6, 9 so as to secure ride comfort and steering stability while reducing a calorific value of the electric actuator 6, 9. Therefore, as illustrated in FIG. 2, the controller 27 includes, for example, a required thrust force calculation unit 28, a low frequency filter 29, a high frequency filter 30, a low frequency limiter 31, a high frequency limiter 32, and an addition unit 33.

The required thrust force calculation unit 28 of the controller 27 constitutes a required thrust force calculation unit, which is an essential component of the present invention. This required thrust force calculation unit 28 calculates a required thrust force from detection values detected by the respective sensors 18 to 24. More specifically, the required thrust force calculation unit 28 calculates a required thrust force value corresponding to a thrust force value that the electric actuator 6, 9 should output according to a specific control law such as the Skyhook theory based on the detection values (at least any of the detection values) from the respective sensors 18 to 24, which is information from the vehicle. The specific control law may be any control such as H-infinity control.

The required thrust force value calculated by the required thrust force calculation unit 28 corresponds to an ideal control force based on a control logic such as the Skyhook theory, and should be calculated in consideration of heat generation and power consumption. Therefore, the present embodiment is configured in such a manner that a required thrust force, which is a calculated value by the required thrust force calculation unit 28, is distributed to a plurality of frequency bands, and is amplitude-limited for each frequency band. Then, a combination (an addition) of the resulting values is output to the inverter 26 as a thrust force instruction value.

More specifically, a required thrust force value calculated by the required thrust force calculation unit 28 is distributed to a low frequency band corresponding to a low-frequency movement such as a movement when the vehicle does a steady turning, and a high frequency band corresponding to a high-frequency movement such as a movement when the vehicle does a slalom or a double lane change. Therefore, the present embodiment is configured in such a manner that a required thrust force value calculated by the required thrust force calculation unit 28 is distributed at the output side of the required thrust force calculation unit 28 in two directions, and is input into a low frequency filter (a low-pass filter) 29 and a high frequency filter (a high-pass filter) 30 disposed at the distribution destinations, respectively.

The low frequency filter 29 and the high frequency filter 30 constitute a frequency band determination unit, which is an essential component of the present invention. The controller 27 is configured so as to distribute a required thrust force value calculated by the required thrust force calculation unit 28 to the low frequency band by transmitting the required thrust force through the low frequency filter 29, and the high frequency band by transmitting the required thrust force through the high frequency filter 30. Limiters 31 and 32 are respectively provided at the output sides of the low frequency filter 29 and the high frequency filter 39 for each frequency band.

More specifically, the low frequency limiter 31, which limits an amplitude in the low frequency band, is provided at the output side of the low frequency filter 29. The high frequency limiter 32, which limits an amplitude in the high frequency band, is provided at the output side of the high frequency filter 30. An output value of the low frequency limiter 31 and an output value of the high frequency limiter 32 are added by the addition unit 33, and is output to the inverter 26 as a thrust force instruction value. The addition unit 33 corresponds to a thrust force instruction value calculation unit, which an essential component of the present invention. In other words, the addition unit 33 combines (adds) output values of the limiters 31 and 32 for each frequency band to generate a thrust force instruction value.

A limit value (an upper limit value) of the low frequency limiter 31 is lower than a limit value (an upper limit value) of the high frequency limiter 32. More specifically, assuming that the limit value of the low frequency limiter 31, which corresponds to a limit value in the low frequency band, is Flmax, and the limit value of the high frequency limiter 32, which corresponds to a limit value in the high frequency band, is Fhmax, the limit values are set so as to satisfy the following equation 1.

$$Fl\max \leq Fh\max \text{ (or } Fl\max < Fh\max)\qquad \text{EQUATION 1}$$

In this case, since the limit value Fhmax is large in the high frequency band, the electric actuator 6, 9 can generate a large control force for a high-frequency movement due to a sudden steering operation or a transient response such as a slalom or a double lane change. As a result, it is possible to secure ride comfort and steering stability.

On the other hand, since the limit value Flmax is low in the low frequency band, a control force of the electric actuator 6, 9 can be reduced for a low-frequency movement such as execution of a steady turning. As a result, it is possible to prevent the electric actuator 6, 9 from continuously outputting a large thrust force, thereby reducing heat generation of the electric actuator 6, 9.

In addition, when there is a high-frequency input from, for example, a protrusion from a road surface in such a state that the electric actuator 6, 9 continuously outputs a constant force such as execution of a steady turning, the electric actuator 6, 9 can output a maximum control force F of the electric actuator 6, 9 from which the limit value Flmax of the low frequency limiter 31 is subtracted, i.e., a control force corresponding to ΔF indicated by the following equation 2, for a movement (a vibration) of the vehicle according to this protrusion.

$$\Delta F = F - Fl\max \quad \text{EQUATION 2}$$

As a result, it is possible to perform control against the protrusion of the road surface to secure ride comfort. Further, regardless of a change in the road surface (regardless of whether there is a high-frequency input due to, for example, a protrusion from a road surface), it is possible to maintain a constant roll angle by the low frequency limiter 31 to prevent a driver from feeling discomfort.

Further, the limit value Flmax of the low frequency limiter 31 and the limit value Fhmax of the high frequency limiter 32 are adjusted according to a temperature (a calorific value) of the electric actuator 6, 9, which is detected by the temperature sensor 24. For example, in a low-temperature state, a same value is set as the limit value Flmax of the low frequency limiter 31 and the limit value Fhmax of the high frequency limiter 32 (Flmax=Fhmax), thereby allowing the electric actuator 6, 9 to output the maximum control force F regardless of the high frequency band or the low frequency band.

On the other hand, when the temperature exceeds a preset first threshold value, the limit value Flmax of the low frequency limiter 31 is set to be smaller than the limit value Fhmax of the high frequency limiter 32 (Flmax<Fhmax), whereby it is possible to reduce heat generation due to a continuous output of a control force. Further, when the temperature of the electric actuator 6, 9 approaches the temperature leading to irreversible flux losses of the permanent magnets 17 and insulation deterioration of the coils 14A, 14B, and 14C, for example, when the temperature exceeds a preset second threshold value (the first threshold value<the second threshold value), both the limit value Flmax of the low frequency limiter 31 and the limit value Fhmax of the high frequency limiter 32 are reduced. As a result, it is possible to protect the electric actuator 6, 9 against a temperature increase without a new mechanism or the like incorporated.

Further, for example, when a running stability control apparatus such as an ABS or an ESC (a skid prevention apparatus) operates due to, for example, a sudden braking operation, the limit value Flmax of the low frequency limiter 31 and the limit value Fhmax of the high frequency limiter 32 are temporarily canceled. In other words, for example, in the event of an emergency, the limit values Flmax and Fhmax are temporarily cancelled according to a movement state of the vehicle, whereby it is possible to secure running stability in the event of an emergency.

The electric suspension control apparatus according to the present embodiment is configured in the above-described manner. Next, an operation thereof will be also described.

When the vehicle vertically vibrates according to, for example, running of the vehicle, a force in the stroke direction (the axial direction) is applied to the suspension apparatus 4, 7 disposed between the vehicle body 1 and the wheel (the front wheel 2 and the rear wheel 3) of the vehicle. According to this force, a relative movement is generated between the movable element 15 and the armature 12 of the electric actuator 6, 9. At this time, power is supplied to the coils 14A, 14B, and 14C according to a control signal (a thrust force instruction value) output from the controller 27, whereby it is possible to adjust a control force of the electric actuator 6, 9 to improve ride comfort and steering stability of the vehicle.

In this case, the required thrust force calculation unit 28 of the controller 27 calculates a required thrust force value corresponding to a thrust force that the electric actuator 6, 9 should output according a specific control law such as the Skyhook theory based on detection values from the respective sensors 18 to 24. The required thrust force value calculated by the required thrust force calculation unit 28 is input to the low frequency filter 29 and the high frequency filter 30, and is distributed to the low frequency band by being transmitted through the low frequency filter 29 and the high frequency band by being transmitted through the high frequency filter 30.

The output value of the low frequency band after transmission through the low frequency filter 29 is amplitude-limited by the low frequency limiter 31. The output value of the high frequency band after transmission of the high frequency filter 30 is amplitude-limited by the high frequency limiter 32. Then, the output value of the low frequency limiter 31 and the output value of the high frequency limiter 32 are added by the addition unit 33, and the added value is output from the controller 27 to the inverter 26 as a thrust force instruction value.

At this time, since the limit value Flmax of the low frequency limiter 31 is lower than the limit value Fhmax of the high frequency limiter 32, it is possible to limit (reduce) a control force output from the electric actuator 6, 9 for a low-frequency movement such as a steady turning. On the other hand, since the limit value Fhmax of the high frequency limiter 32 is larger than the limit value Flmax of the low frequency limiter 31, it is possible to output a control force from the electric actuator 6, 9 without limiting (reducing) it for a high-frequency movement due to a sudden steering operation or a transient response such as a slalom or a double lane change.

According to the present embodiment, it is possible to reduce a calorific value of the electric actuator 6, 9, and at the same time, secure ride comfort and steering stability.

More specifically, the controller 27 is configured so as to distribute a required thrust force value calculated by the required thrust force calculation unit 28 based on detection values of the respective sensors 18 to 24 to the low frequency band and the high frequency band by the low frequency filter 29 and the high frequency filter 30, limit an amplitude by the low frequency limiter 31 and the high frequency limiter 32, and then output a sum thereof added by the addition unit 33 as a thrust force instruction value.

At this time, since the limit value Flmax of the low frequency limiter 31 is set to a small value, when a low-frequency control force (thrust force) is output from the electric actuator 6, 9, it is possible to limit (reduce) this control force. Therefore, it is possible to reduce a calorific value of the electric actuator 6, 9 to prevent insulation deterioration of the coils 14A, 14B, and 14C and irreversible flux losses of the permanent magnets 17. As a result, it is possible to use a permanent magnet having a low retention force (magnetic force) as the permanent magnets 17 and a coil having a low temperature characteristic as the coils 14A, 14B, and 14C to cut down cost of the permanent magnets 17 and the coils 14A, 14B, and 14C.

Further, since the limit value Fhmax of the high frequency limiter 32 is large, when a high-frequency control force is output from the electric actuator 6, 9, it is possible to output this control force without a limitation (or with a small limitation if any). As a result, it is possible to secure ride comfort and steering stability.

According to the present embodiment, the controller 27 is configured so as to calculate a required thrust force value by the required thrust force calculation unit 28 from detection values of the respective sensors 18 and 24. More specifically, the controller 27 is configured in such a manner that the required thrust force calculation unit 28 collectively uses sensor signals (detection values) of the respective sensors 18 to 24 for the calculation without dividing control into posture control and vibration control. As a result, it is possible to acquire a high control effect. More specifically, for example, it is possible to enhance the control effect compared to a configuration that calculates a signal from the sensors while distributing it to posture control and vibration control, such as using a signal from the vertical acceleration sensor for vibration control and using a lateral acceleration and a vertical acceleration for posture control.

According to the present embodiment, the controller 27 is configured so as to adjust the limit values Flmax and Fhmax of the limiters 31 and 32 according to a temperature of the electric actuator 6, 9. Therefore, when a temperature of the electric actuator 6, 9 is low, the limit values Flmax and Fhmax are set to large values, whereby it is possible to maximally output a control force of the electric actuator 6, 9. As a result, it is possible to further improve ride comfort and steering stability. On the other hand, when the temperature of the electric actuator 6, 9 increases, the limit values are set to small values, whereby it is possible to reduce a calorific value of the electric actuator to highly efficiently prevent insulation deterioration of the coils and irreversible flux losses of the permanent magnets.

According to the present embodiment, the controller 27 is configured so as to temporarily cancel the limit values Flmax and Fhmax of the limiters 31 and 33 according to an operation state of the vehicle. Therefore, in the event of an emergency such as a sudden braking operation, it is possible to maximally output a control force of the electric actuator 6, 9 regardless of the high frequency band or the low frequency band. As a result, it is possible to secure running stability in the event of an emergency.

According to the present embodiment, the controller 27 is configured in such a manner that the high frequency band corresponds to a high-frequency movement such as a slalom and a double lane change of the vehicle, and the low frequency band corresponds to a low-frequency movement such as a steady turning of the vehicle. Therefore, it is possible to reduce a control force of the electric actuator 6, 9 for a low-frequency movement such as a steady turning. As a result, it is possible to prevent a large thrust force from being continuously output from the electric actuator 6, 9 to reduce a calorific value of the electric actuator 6, 9. On the other hand, it is possible to generate a large control force from the electric actuator 6, 9 for a high-frequency movement due to a sudden steering operation and a transient response such as a slalom or a double lane change. As a result, it is possible to secure ride comfort and steering stability.

Figure 5:
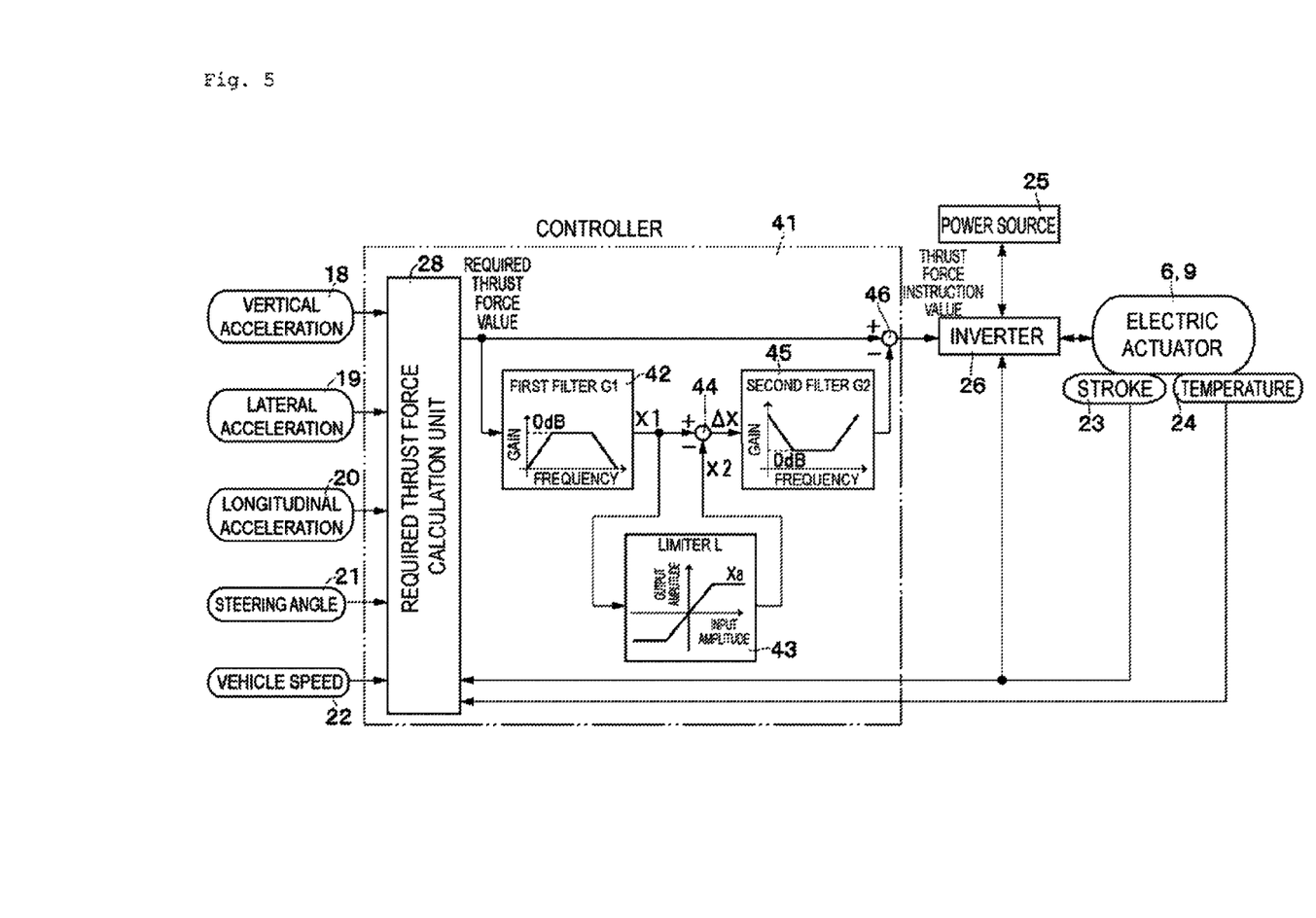
FIG. 5 is a control block diagram illustrating an electric suspension control apparatus according to a second embodiment.

Next, FIG. 5 illustrates a second embodiment of the present invention. The present embodiment is characterized in that the controller 27 is configured so as to extract a specific frequency band from a required thrust force value by a first filter, limit an amplitude by a limiter, and readjust a phase by a second filter to then generate a thrust force instruction value. In the following description of the present embodiment, similar features to the above-described first embodiment will be indicated by the same reference numerals, and descriptions thereof will be omitted.

A controller 41 includes, for example, a required thrust force calculation unit 28, a first filter 42, a limiter 43, a first subtraction unit 44, a second filter 45, and a second reduction unit 46.

A required thrust force value calculated by the required thrust force calculation unit 28 is distributed at the output side of the required thrust force calculation unit 28 in two directions. One of them is input into the first filter 42, and the other is input into the second subtraction unit 46. The first filter 42 corresponds to the frequency band determination unit, which is an essential component of the present invention. The controller 41 is configured so as to input a required thrust force value calculated by the required thrust force calculation unit 28 to the first filter 42, and a predetermined frequency band— is extracted from the required thrust force value. The predetermined frequency band can be, for example, a low frequency band corresponding to a low-frequency movement such as a steady turning.

An output value X1 of the first filter 42 is distributed at the output side of the first filter 42 in two directions. One of them is input into the limiter 43 that limits an amplitude of a predetermined frequency band. The other is input into the first subtraction unit 44. The first subtraction unit 44 constitutes the thrust force instruction value calculation unit, which is an essential component of the present invention, together with the second filter 45 and the second subtraction unit 46, which will be described below. The first subtraction unit 44 subtracts an output value X2 of the limiter 43 from the output value X1 of the first filter 42 to acquire a subtracted value ΔX. Then, the controller 41 is configures so as to adjust a phase of the subtracted value ΔX according to the required thrust value by the second filter 45, and then subtract, by the second substraction unit 46, the output value (the subtracted value ΔX with its phase adjusted) of the second filter 45 from the required thrust force value calculated by the required thrust force calcilation unit 28, thereby generating a thrust force instruction value. The second filter 45 adjusts a phase of the subtracted value ΔX according to the required thrust force value, and can be configured as, for example, an inverse filter of the first filter 42.

Assuming that a limit value (an upper limit value) of the limiter 43 is Xa, the limiter 43 does not work in a case where the output value X1 of the first limiter 42 that is input into the limiter 43 is a small value (|X1|≤Xa). More specifically, in this case, the relationship between the output value X1 of the first filter 42 that is input into the first subtraction unit 44 and the output value X2 of the limiter 43 is X1=X2, whereby the subtracted value ΔX, which is a difference between the output value X1 and the output value X2, becomes zero as indicated by the following equation 3.

$$\Delta X = X1 - X2 = 0 \qquad \text{EQUATION 3}$$

In this case, the output value of the second filter 45, i.e., the subtracted ΔX with its phase adjusted by the second filter 45 according to the required thrust force value also becomes zero, whereby the required thrust force value is output from the second subtraction unit 46 without any change made thereto as a thrust force instruction value. Therefore, it is possible to output the required thrust force value from the controller 41 to the inverter 26 as a thrust force instruction value without being affected by the first filter 42 and the limiter 43.

On the other hand, in a case where the output value X1 of the first filter 42, which is input into the limiter 43, is a large value ($|X1| \geq Xa$), the second output value X2 is output from the first subtraction unit 44 as the subtracted value $\Delta X$ ($=X1-X2$). The phase of this subtracted value $\Delta X$ is displaced under the influence of the first filter 42, and therefore is readjusted by the second filter 45. In other words, the second filter 45 adjusts the phase of the subtracted value $\Delta X$ according to the required thrust force. Then, the second subtraction unit 46 subtracts the subtracted value $\Delta X$ with its phase adjusted from the required thrust force value to thereby output a difference (a subtracted value) between the required thrust force value and the subtracted value $\Delta X$ with its phase adjusted as a thrust force instruction value.

In this way, the thus-configured second embodiment can also provide the almost same effect as the above-described first embodiment. Especially, according to the present embodiment, the controller 41 is configured so as to extract a specific frequency band from a required thrust force value calculated by the required thrust force calculation unit 28, limit an amplitude by the limiter 43, and readjust the phase by the second filter 45, thereby generating a thrust force instruction value.

Therefore, in a case where the output value X1 of the first filter 42 is small (a movement of a predetermined frequency band is small), it is possible to output a required thrust force value calculated by the required thrust force calculation unit 28, i.e., a required thrust force value corresponding to an ideal control force based on a control logic such as the Skyhook theory to the inverter 26 without being affected by the first filter 42, the limiter 43, and the second filter 45. Further, in a case where the output value X1 of the first filter 42 is large (a movement of a predetermined frequency band is large), a difference between a required thrust force value and the subtracted value $\Delta X$ with its phase adjusted by the second filter 45 is output to the inverter 26 as a thrust force instruction value. Therefore, in this case, it is also possible to reduce an influence of the first filter 42, i.e., a lead and a delay of the phase by the first filter 42. As a result, it is possible to more highly effectively secure ride comfort and steering stability.

Figure 6:
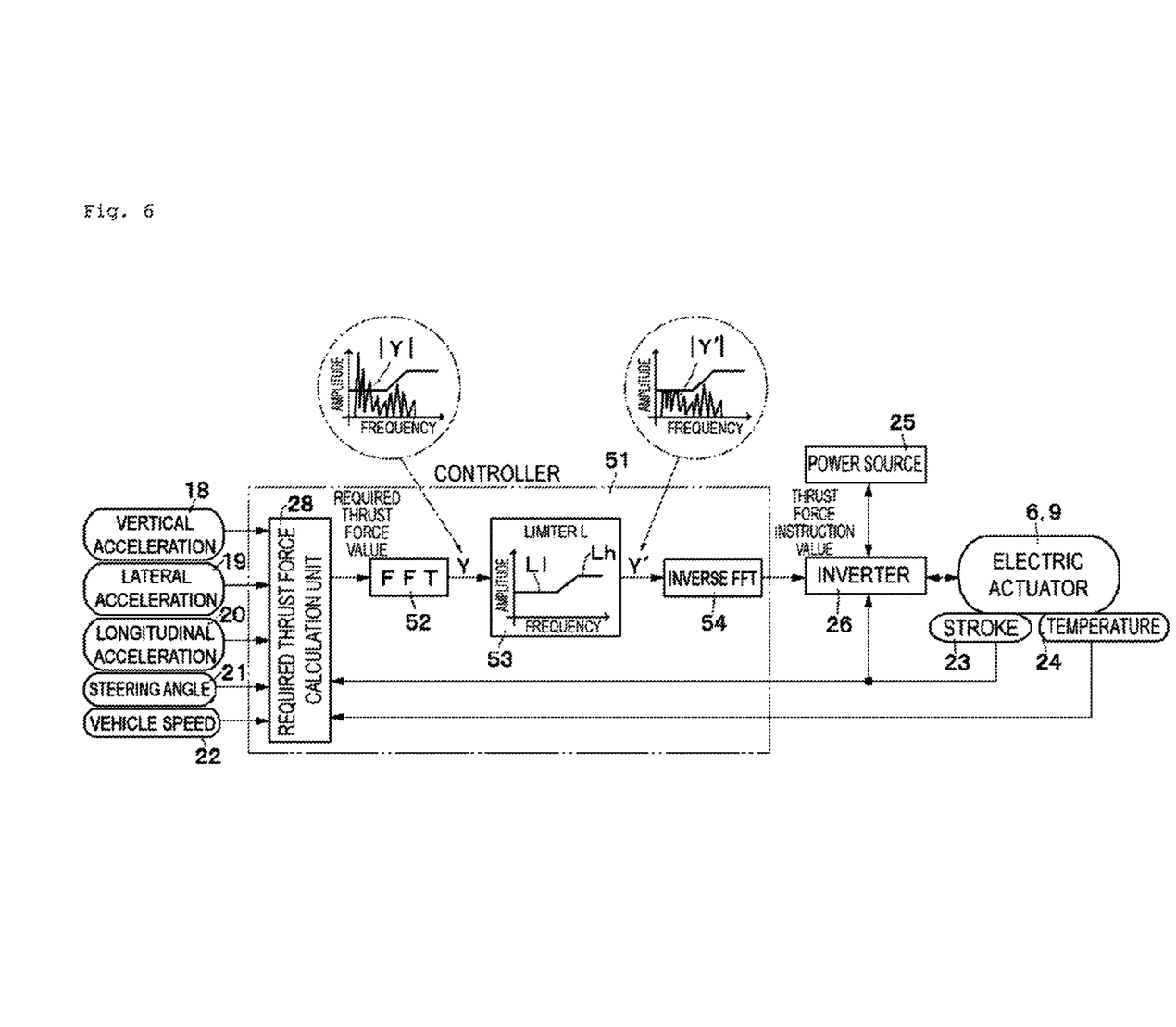
FIG. 6 is a control block diagram illustrating an electric suspension control apparatus according to a third embodiment.

Next, FIG. 6 illustrates a third embodiment of the present invention. The present embodiment is characterized in that a controller is configured so as to convert a required thrust force value into a signal in the frequency domain by FFT (fast Fourier transformation), limits an amplitude by a limiter, and then generate a signal in the time domain from conversion by inverse FFT as a thrust force instruction value. In the following description of the present embodiment, similar features to the above-described first embodiment will be indicated by the same reference numerals, and descriptions thereof will be omitted.

The controller 51 includes, for example, a required thrust force calculation unit 28, an FFT unit 52, a limiter 53, and an inverse FFT unit 54.

A required thrust force value calculated by the required thrust force calculation unit 28 is input into the FFT unit 52. The FFT unit 52 constitutes the frequency band determination unit, which is an essential component of the present invention. The FFT unit 52 is configured so as to convert a required thrust force value calculated by the required thrust force calculation unit 28 into a signal in the frequency domain by FFT to distribute it to a plurality of frequency bands.

An output value Y of the FFT unit 52 is input into the limiter 53. This limiter 53 limits an amplitude of a signal (the output value Y) output from the FFT unit 52 for each frequency band. In this case, as illustrated in FIG. 6, a limit value L1 of a low frequency band is set to a small value compared to a limit value Lh of a high frequency band (Lh>L1). Therefore, as illustrated in FIG. 6, the output value Y of the FFT unit 52, which is input to the limiter 53, is output from the limiter 53 as an output value Y'.

The output value Y' output from the limiter 53 is input into the inverse FFT unit 54. The inverse FFT unit 54 constitutes the thrust force instruction value calculation unit, which is an essential component of the present invention. The inverse FFT unit 54 converts the output value Y' of the limiter 53 into a signal in the time domain by inverse FFT to generate a thrust force instruction value. Then, the thrust force instruction value is output from the inverse FFT unit 54 to the inverter 26.

In this way, the thus-configured third embodiment can also provide the almost same effect as the above-described first embodiment. Especially, according to the present embodiment, the controller 51 is configured in such a manner that the FFT unit 52 converts a required thrust force value into a signal in the frequency domain by FFT, the limiter 53 limits an amplitude, and the inverse FFT unit 54 performs inverse FFT for conversion into a signal in the time domain, thereby generating a thrust force instruction value.

Therefore, it is possible to eliminate an influence of the filter (a lead and a delay of a phase) compared to the controller using the filter. Further, the limiter 53 allows the limit value to be finely set for each frequency band, so it is possible to more highly effectively achieve both a reduction in a calorific value of the electric actuator 6, 9 and securement of ride comfort and steering stability.

The above-described respective embodiments have been described based on an example configured so as to use the acceleration sensors 18 to 20, the steering angle sensor 21, the vehicle speed sensor 22, the stroke sensor 23, and the temperature sensor 24 as the movement detection units. However, the present invention is not limited thereto. For example, the present invention may be configured so as to use another movement detection unit such as sensors for detecting, for example, an operation amount of an accelerator and a state of a brake system. In other words, the present invention may use any operation detection unit capable of detecting a movement state of the vehicle, i.e., capable of acquiring information indicating an operation state of the vehicle as the movement detection unit without any specific limitation.

For example, the present invention may use a GPS sensor that receives a GPS signal and detects a movement state of the vehicle by calculating, for example, road surface information (a vertical speed component), positional information, and altitude information based on the received signal. Further, the present invention may use signals (information) of an in-vehicle preview sensor and a direction indicator (a blinker). Further, the present invention can acquire a movement state of the vehicle by predicting a movement direction of the vehicle and a disturbance from road surface information, vehicle speed information, and information of a direction indicator included in a car navigation system. Further, which movement detection unit should be used is unlimited, and the present invention can be configured so as to use at least one movement detection unit.

The above-described respective embodiments have been described based on an example configured in such a manner that the stator 10 of the electric actuator 6, 9 is disposed at the vehicle body 1, which is the sprung member of the vehicle, and the movable element 15 is dispose at an axle, which is the unsprung member of the vehicle. However, the present invention is not limited thereto. For example, the vehicle may be configured in such a manner that the stator is disposed at the unsprung member of the vehicle, and the movable element is disposed at the sprung member of the vehicle.

Further, the above-described respective embodiments have been described based on an example in which the electric actuator 6, 9 is a linear motor circular in cross-section, i.e., the stator 10 and the movable element 15 are formed into a cylindrical shape. However, the present invention is not limited thereto. For example, the electric actuator 6, 9 may be constituted by a linear motor having another shape than a circular shape in cross-section such as a linear motor having an I shape (a flat plate shape), a rectangular shape, or an H shape in cross-section. Further, the electric actuator may be constituted by a rotational motor and a ball screw mechanism instead of the linear motor.

According to the above-described embodiments, it is possible to reduce a calorific value of the electric actuator.

More specifically, the control unit is configured so as to distribute a required thrust force value, which is calculated by the required thrust force calculation unit based on a detection value of the movement detection unit, to a plurality of frequency bands by the frequency band determination unit, limits an amplitude by a limiter, and then output a combination of them combined by the thrust force instruction value calculation unit as a thrust force instruction value.

At this time, the limit values of the limiters are set in such a manner that the value in the low frequency band is smaller than the value in the high frequency band. Therefore, when a low-frequency thrust force is output from the electric actuator, it is possible to limit (reduce) this thrust force. Therefore, it is possible to reduce a calorific value of the electric actuator to prevent the coils and the permanent magnets constituting the electric actuator from having insulation deterioration and irreversible flux losses, respectively. As a result, it is possible to use a permanent magnet having a low retention force (magnetic force) as the permanent magnets and a coil having a low temperature characteristic as the coils to cut down cost of the permanent magnets and the coils.

Further, the limit values of the limiters are set in such a manner that the value in the high frequency bans is larger than the value in the low frequency band. Therefore, when a high-frequency control force is output from the electric actuator, it is possible to output this thrust force without any limitation (or with a small limitation if any). As a result, it is possible to secure ride comfort and steering stability.

According to one embodiment of the present invention, the controller is configured so as to adjust the limit values of the limiters according to a temperature of the electric actuator. Therefore, when a temperature of the electric actuator is low, the limit values are set to large values, whereby it is possible to maximally output a thrust force of the electric actuator. As a result, it is possible to further improve ride comfort and steering stability. On the other hand, when the temperature of the electric actuator increases, the limit values are set to small values, whereby it is possible to reduce a calorific value of the electric actuator to highly efficiently prevent insulation deterioration of the coils and irreversible flux losses of the permanent magnets.

According to one embodiment of the present invention, the controller is configured so as to temporarily cancel the limit values of the limiters according to an operation state of the vehicle. Therefore, in the event of an emergency such as a sudden braking operation, it is possible to maximally output a thrust force of the electric actuator regardless of the high frequency band or the low frequency band. As a result, it is possible to secure running stability in the event of an emergency.

According to one embodiment of the present invention, the controller is configured in such a manner that the high frequency band corresponds to a high-frequency movement such as a slalom and a double lane change of the vehicle, and the low frequency band corresponds to a low-frequency movement such as a steady turning of the vehicle. Therefore, it is possible to reduce a thrust force of the electric actuator for a low-frequency movement such as a steady turning. As a result, it is possible to prevent a large thrust force from being continuously output from the electric actuator to thereby reduce a calorific value of the electric actuator. On the other hand, it is possible to generate a large control force from the electric actuator for a high-frequency movement due to a sudden steering operation and a transient response such as a slalom and a double lane change. As a result, it is possible to secure ride comfort and steering stability.

According to one embodiment of the present invention, the controller is configured so as to distribute a required thrust force value to the low frequency band and the high frequency band by the lower frequency filter and the high frequency filter, limit respective amplitudes by the lower frequency limiter and the high frequency limiter, and add them, thereby generating a thrust force instruction value. Therefore, it is possible to achieve a simple structure using two filters and two limiters.

According to one embodiment of the present invention, the controller is configured so as to extract a specific frequency band from a required thrust force value by the first filter, limit an amplitude by the limiter, and readjust a phase by the second filter, thereby generating a thrust force instruction value. Therefore, it is possible to reduce a lead and a delay of the phase generated by the first filter.

According to one embodiment of the present invention, the controller is configured so as to convert a required thrust force value into a signal in the frequency domain by FFT, limit an amplitude by the limiter, and generate a signal in the time domain from conversion by inverse FFT as a thrust force instruction value. Therefore, it is possible to eliminate an influence (a lead and a delay of a phase) by the filter, compared to the controller using the filter. Further, it is possible to finely set the limit value for each frequency band, and therefore possible to highly effectively achieve both a reduction in a calorific value of the electric actuator and securement of ride comfort steering stability.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2012-018947, filed on Jan. 31, 2012. The entire disclosure of Japanese Patent Applications No. 2012-018947, filed on Jan. 31, 2012 including specification, claims, drawings and summary is incorporated herein by reference in its entirety.

What is claimed is:

1. An electric suspension control apparatus disposed between a body and a wheel of a vehicle, and configured to adjust a thrust force of an electric actuator according to a thrust force instruction value output by a control unit,
wherein at least one movement detection unit is connected to the control unit, the movement detection unit being configured to detect a movement state of the vehicle, wherein the control unit includes
a required thrust force calculation unit configured to calculate a required thrust force value from a detection value detected by the movement detection unit,
a frequency band determination unit configured to distribute the calculated value of the required thrust force calculation unit to a plurality of frequency bands,
a limiter provided for each of the frequency bands to which the calculated value is distributed by the frequency band determination unit, and
a thrust force instruction value calculation unit configured to generate the thrust force instruction value by combining an output value by the limiter for each frequency band, and
wherein a limit value of the limiter is set in such a manner that the a value in a low frequency band as one of the frequency bands is smaller than a value in a high frequency band as another of the frequency bands.

2. The electric suspension control apparatus according to claim 1, wherein the limiter adjusts the limit value according to a temperature of the electric actuator.

3. The electric suspension control apparatus according to claim 1, wherein the control unit temporarily cancels the limit value of the limiter according to the movement state of the vehicle.

4. The electric suspension control apparatus according to claim 1, wherein the high frequency band corresponds to a high-frequency movement, for example, when the vehicle performs a slalom or a double lane change, and
wherein the low frequency band corresponds to a low-frequency movement, for example, when the vehicle does a steady turning.

5. The electric suspension control apparatus according to claim 1, the frequency band determination unit is configured so as to distribute the calculated value of the required thrust force calculation unit to a low frequency band through a low frequency filter and a high-frequency band through a high frequency filter,
wherein the limiter includes a low frequency limiter that limits an amplitude in the low frequency band, and a high frequency limiter that limits an amplitude in the high frequency band,
wherein the thrust force instruction value calculation unit generates the thrust force instruction value by adding an output value of the low frequency limiter and an output value of the high frequency limiter, and
wherein the limit value of the low frequency limiter is smaller than the limit value of the high frequency limiter.

6. The electric suspension control apparatus according to claim 1,
wherein the frequency band determination unit is configured to input the calculated value of the required thrust force calculation unit to a first filter and extract a predetermined frequency band through the first filter,
wherein the limiter limits an amplitude in the predetermined frequency band,
wherein the thrust force instruction value calculation unit acquires a subtracted value ($\Delta X$) by subtracting an output value ($X2$) of the limiter from an output value ($X1$) of a first filter, adjusts a phase of the subtracted value ($\Delta X$) according to the calculated value of the required thrust force calculation unit by a second filter, and subtracts the subtracted value ($\Delta X$) with its phase adjusted from the calculation value of the required thrust force calculation unit, thereby generating the thrust force instruction value.

7. The electric suspension control apparatus according to claim 1,
wherein the frequency band determination unit is configured to convert the calculated value of the required thrust force calculation unit into a signal in a frequency domain by fast Fourier transformation (FFT), and distribute the converted signal to a plurality of frequency bands,
wherein the limiter limits an amplitude of a signal transformed by the FFT for each frequency band, and
wherein the thrust force instruction value calculation unit converts an output value of the limiter by inverse FFT into a signal in a time domain to generate the thrust force instruction value.

* * * * *